United States Patent [19]

Hargrave et al.

[11] Patent Number: 4,601,029

[45] Date of Patent: Jul. 15, 1986

[54] COMMUNICATION SWITCHING SYSTEM

[75] Inventors: Franklin Hargrave; Francisco A. Middleton, both of Newtown, Conn.

[73] Assignee: ITT Corporation, New York, N.Y.

[21] Appl. No.: 653,754

[22] Filed: Sep. 21, 1984

[51] Int. Cl.[4] .......................... H04Q 11/04; H04J 3/02
[52] U.S. Cl. .......................................... 370/67; 370/85
[58] Field of Search ....................... 370/67, 85, 108, 88

[56] References Cited

U.S. PATENT DOCUMENTS

| | | | |
|---|---|---|---|
| 3,732,374 | 5/1973 | Rocher et al. | 370/85 |
| 4,140,877 | 2/1979 | Joslow et al. | 370/67 |
| 4,488,290 | 12/1984 | Dunn et al. | 370/67 |
| 4,562,573 | 12/1985 | Murano et al. | 370/85 |

Primary Examiner—Douglas W. Olms
Assistant Examiner—Frank M. Scutch, III
Attorney, Agent, or Firm—Peter C. Van Der Sluys; Robert A. Hays

[57] ABSTRACT

A time-division multiplexed switching system is disclosed with a transmit, and a receive bus. Communication ports are provided for transfer and conversion of signals between the lines and the buses. A control microprocessor is used for assigning appropriate time slots and for strobing the communication ports at appropriate times. The time slot interchange between the two buses is provided by a half-frame delay network. The slots assigned to a particular interconnected pair of communication ports differ by a half-frame period to provide full duplex operation.

14 Claims, 6 Drawing Figures

FIG.1

(PRIOR ART)

COMMUNICATION SWITCHING SYSTEM

BACKGROUND OF THE INVENTION

1. Field of the Invention

This invention pertains to a switching system which provides communication between a plurality of ports, and more particularly to a system having a common bus over which signals are exchanged between said ports by a time division multiplexing technique.

2. Description of the Prior Art

Various switching networks have been proposed for high speed switching of digital and/or analog signals between a plurality of lines. As the number of lines connected to each network and data transmission increased these networks became more and more complex. Moreover as the amount of information being processed approaches the maximum capacity of a particular network, internal blocking also became frequent. The following United States Patents disclose some of these problems and suggest various solutions thereto.

U.S. Pat. No. 3,694,580 to Inose et al discloses a typical switching system in which two time division multiplexed buses are used as a data transfer means. The PCM signals on the buses are partitioned into frames, each frame comprising a plurality of channels of 8 bit intervals. The bit intervals are further subdivided into minibit intervals. The information contained in these minibit intervals are individually transferred from one bus to another by a complicated scheme in which the contents of some of the minibits of a particular frame are exchanged by delaying them to avoid blocking. A memory is used to keep track of the bits.

U.S. Pat. No. 3,740,483 to Pedersen also pertains to a switching network in which various time slots in a given frame are interchanged as the frame propagates from one stage of the network to the next. As a particular bit stream progresses from line A to line B it may be subject to both space switching and time switching. However, in full duplex communication a corresponding bit stream also progresses from B to A. Since the two paths are complementary, Pedersen eliminates some redundancy by using a bilateral time slot exchanger and a control memory having a single control word to control the interchange of the bit streams in either direction between any two lines.

U.S. Pat. No. 3,787,631 to Lewis discloses a system comprising a plurality of stations interconnected by a control time division switching network. At the beginning of each transmission each station requests a time slot from the control network. The central network detects the first idle time slot in the frame and assigns it to the requesting station. Each station actually takes the time slot following the designated time slot to compensate for various computational delays of the central network.

U.S. Pat. No. 3,920,916 to Brightman et al discloses a digital switching network interconnecting a large number of send and receive circuits by time division multiplexing. Send and receive memory means are used for temporarily storing the data while a proper time slot is assigned to each send/receive pair by a control circuit. The send memory means can transmit data in any sequence ordered by the control circuit. Furthermore a special duplex circuit is provided for two-way communication between a particular circuit pair.

OBJECTIVES AND SUMMARY OF THE INVENTION

An objective of the present invention is to provide a switching system which consists of a minimum number of components so that it is easy to trouble shoot and inexpensive.

Yet a further objective is to provide a system adapted to handle analog or digital signals.

Another further objective is to provide a simple but effective time slot interchanger.

Other objectives and advantages shall become apparent from the following description of the invention.

According to the present invention, a switching system comprises a plurality of communication ports through which communication signals are received and transmitted. The purpose of the switching system is to transfer selectively a signal from any one port to any other port. To this end the signals are transferred by the respective ports (after suitable conversion if necessary) to a TRANSMIT (Tx) bus in a time multiplexed fashion such as by using pulse-coded modulation (PCM). Similarly all the signals from a RECEIVE (Rx) bus are received at a port in time multiplexed fashion. Other forms of modulation could also be used such as pulse amplitude modulation (PAM).

The communication ports may take many forms. They may be line interface circuits connecting subscriber lines to a switching system or trunk line interface circuits connecting trunks to a switching system. The communication ports could also be junctors that interconnect switching systems directly.

Each port accesses the Tx and Rx buses only during a time slot so designated by a controller. The signals on the Tx bus must be delayed and transferred to the Rx bus so that they are received by the proper port when it accesses the Rx bus during its designated time slot. This is accomplished by delaying the Tx bus by one half of a frame period and then feeding the same to the Rx bus. The time slots assigned to the communication ports which communicate with each other differ by the same half-frame period. A frame period is the time that elapses betweeh the start of the time slots during which a particular port accesses the buses.

DETAILED DESCRIPTION OF THE INVENTION

Figure 1:
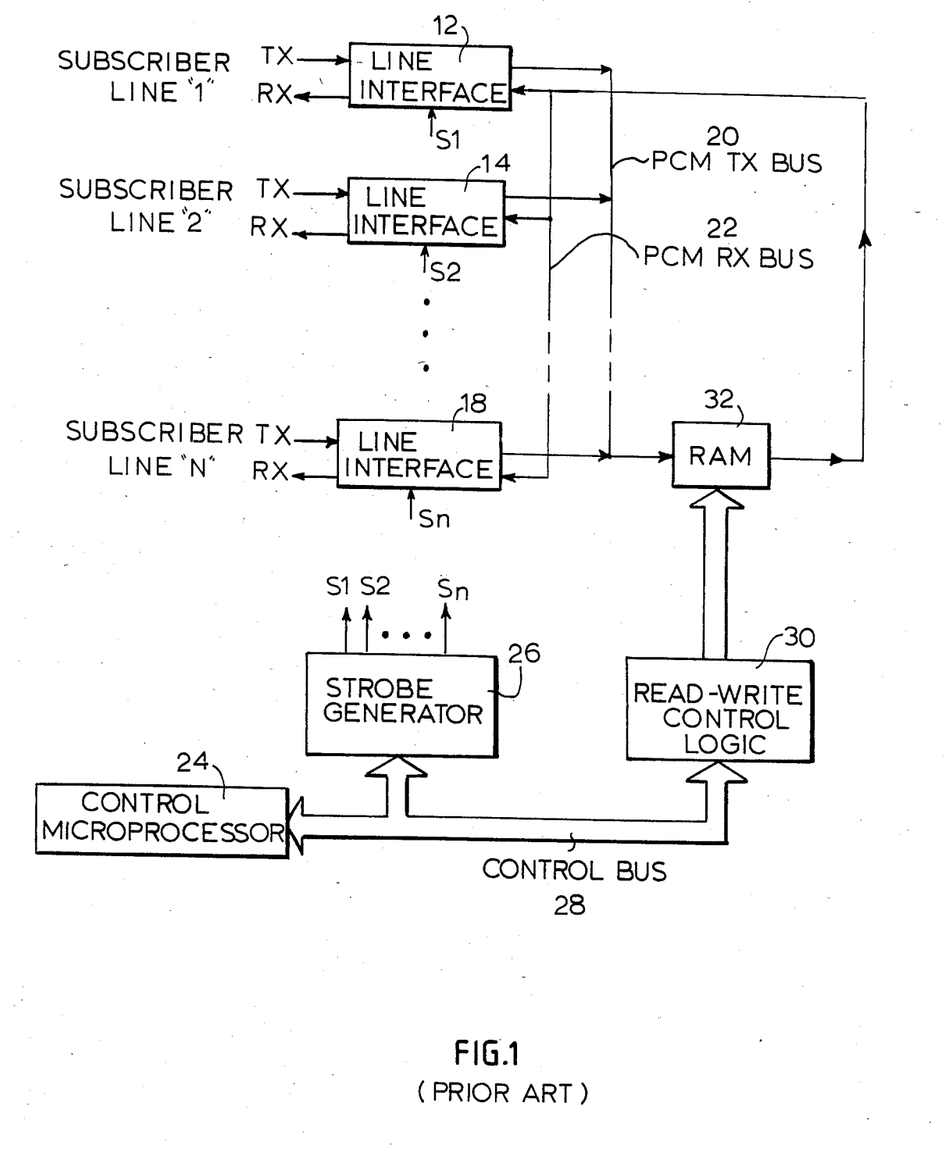
FIG. 1 shows schematically a prior art digital switching network.

A typicaL prior art switching system is shown in FIG. 1 in a schematic form. This system is known as the ITT 1240 Digital Exchange and has been fully described in ELECTRICAL COMMUNICATION, Volume 56, Number 2/3, 1981, pp. 135–160 as well as U.S. Pat. Nos. 4,201,891; 4,293,946 and 4,317,962. This system has been selected because it can be easily adapted to perform in accordance with the subject invention. Briefly the system comprises a plurality of line interface circuits 12, 14, 18, connected to subscriber lines 1, 2 . . . N as shown. This description uses subscriber line circuits for illustrative purposes; however, it should be understood that the line circuits could be replaced by trunk line circuits, junctors, etc. Signals from these circuits are transferred to PCM TRANSMIT (Tx) bus 20 and data is received from PCM RECEIVE (Rx) bus 22. A time division multiplexing scheme is used whereby a time frame is divided into X or more time slots. A control microprocessor 24 is used to assign time slots to each line interface circuit. During the time slot alotted to a particular interface circuit, the circuit simultaneously accesses both the Tx and the Rx buses. Control microprocessor 24 assigns to each interface circuit requesting access to another circuit the first available time slot so that at any given time the assignment of each slot is rather random. The control microprocessor sends the designated time slot information to a strobe generator 26 over control bus 28. The strobe generator then provides control signals which enable each line interface during the appropriate time slot to allow access to the buses.

Figure 2:
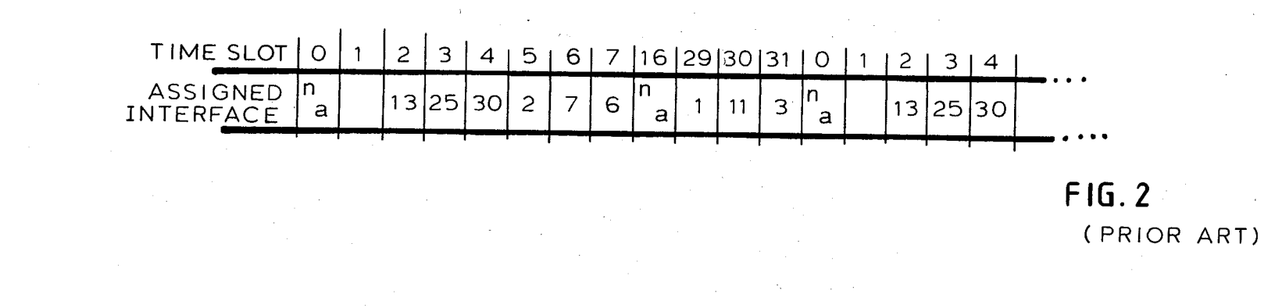
FIG. 2 shows a typical TDM frame slot assignment for the network of FIG. 1.

In FIG. 2, a typical 32-slot time frame is shown together with some possible interfaces assigned to selected slots. Two of the slots (in this instance 0 and 16) are usually used for control functions and are thus unavailable. These slots have been labeled $n_a$. Hence in time slot No. 2 interface 13 is given access to both buses, time slot No. 3, is alloted to interface 25 and so on. However if interface 13 (time slot 2) is to exchange data with interface 7 (time slot 6), the data from time slot No. 2 of the Tx bus must be placed in time slot No. 6 of the Rx bus and vice versa. This is accomplished by a rather complex switching system comprising read/write control logic circuit 30 and random access memory 32 interconnected as shown in FIG. 1.

Figure 3:
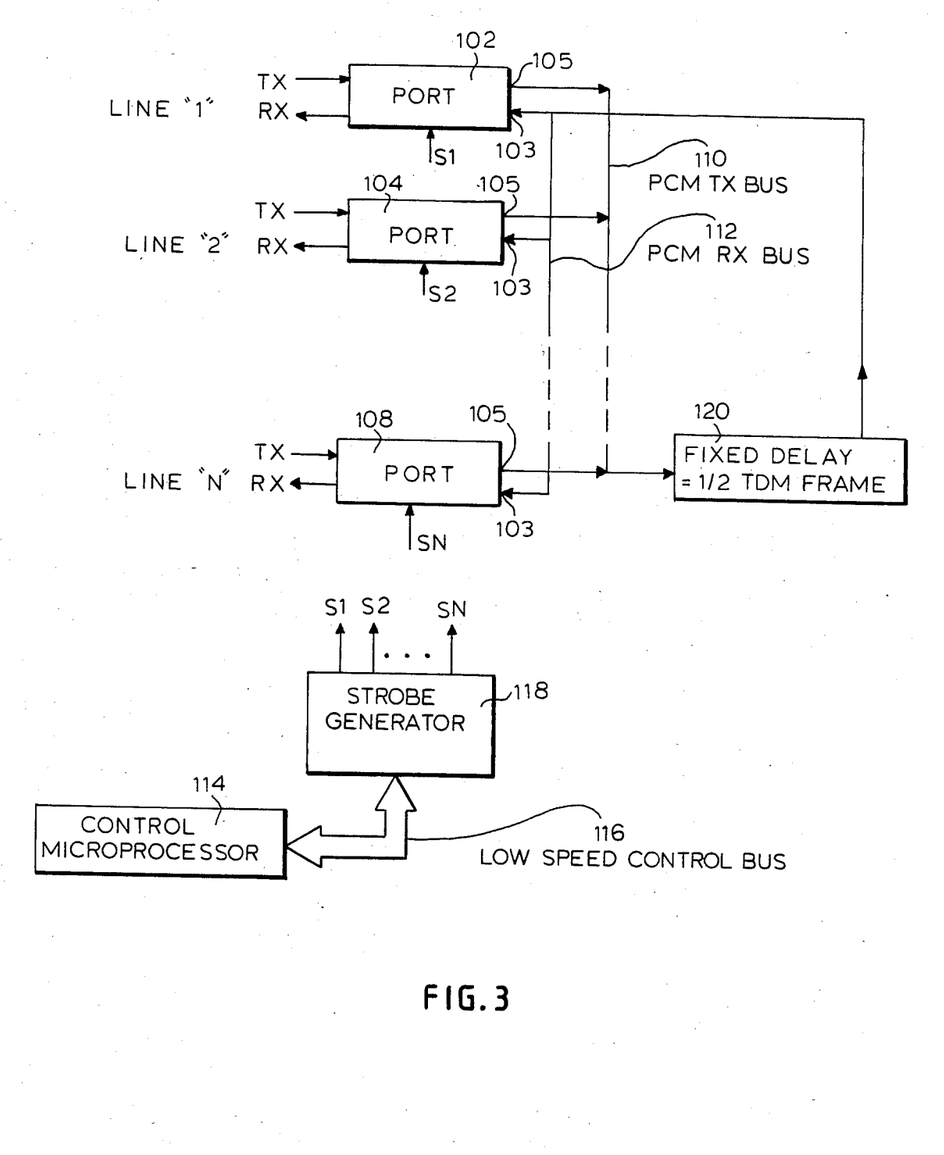
FIG. 3 shows a network structured in accordance with the present invention.

The present inventors have found that for small systems, i.e. systems with up to 200 subscriber lines, the complex switching system and time slot interchanger are not required if a system as shown in FIG. 3 is used.

Figure 4:
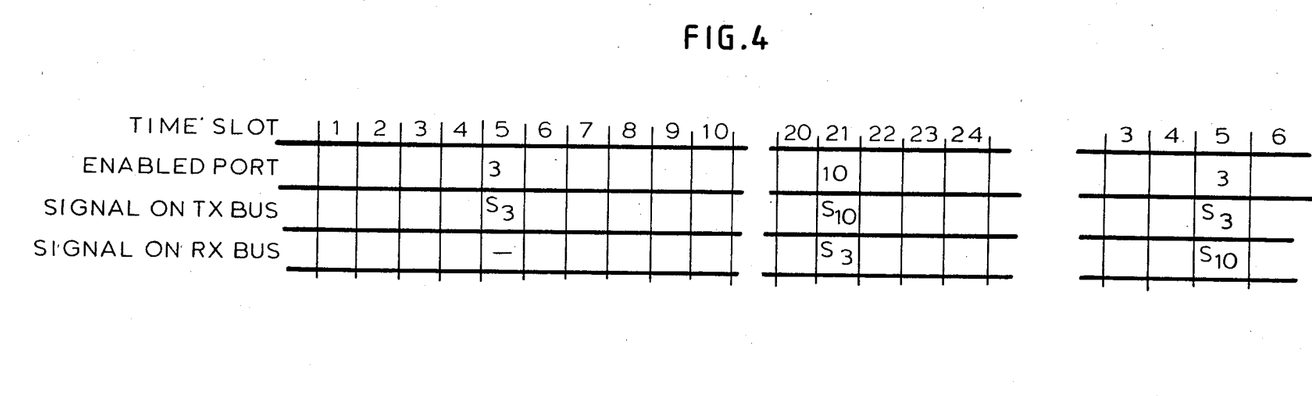
FIG. 4 shows a typical TDM frame slot assignment for the system of FIG. 3.

The principles of operation of the present invention are illustrated in FIGS. 3 and 4. A plurality of lines 1, 2 . . . N are connected to communication ports 102, 104, 108 respectively. The communication ports each have an input port 103 and an output port 105 for connection to the Rx and Tx buses respectively. It is to be understood that the term communication port is used generically to represent any of a number of known interface devices for interfacing with subscriber lines, trunk lines, or other switching systems. The actual member of lines connected to the system is determined by the desired traffic handling capability, number of time slots and the speed of the Tx and Rx buses.

Signals from the respective lines are transferred by the communication ports to Tx bus 110. Signals to the respective lines are transferred by the communication ports from Rx bus 112. A control microprocessor 114 sends appropriate signals on a low speed control bus 116 to a strobe generator 118. The strobe generator in turn generates control signals $S_1 \ldots S_n$ for communication ports 102, 104 . . . 108 during the appropriate time slots.

The communication ports in response to the control signals access both the Tx and Rx buses. FIG. 3 shows a single strobe generator providing control signals to all of the communication ports. In order to conserve back plane wiring separate strobe generators could be provided in each communication port. In such a case the control bus 116 would be directed to the individual communication ports.

However, instead of a complex switching system, the Tx bus 110 is connected to an Rx bus 112 by a simple delay circuit 120 which is adapted to provide a delay equal to one half of the frame period. If a frame is T seconds, delay circuit 120 generates a T/2 second time delay. The effect of the delay circuit is to generate a fixed relationship between all the times during which the signals appear on the slots of the Tx and Rx buses. Microprocessor 114 is adapted to always assign to the two ports which are to be connected, time slots which are T/2 seconds or one half frame apart.

Referring to FIG. 4, if there are 32 time slots per frame and port 3 (calling) requests connection to port 10, port 3 is assigned the first available slot, such as for example slot 5 and port 10 (called) is assigned the time slot which occurs one half frame after time slot 5. Thus, a signal $S_3$ from port 3 is transferred to Tx bus 110 during time slot 5 and is delayed one half frame and is then transferred to the Rx bus 112 as time slot 21 occurs and port 10 (called) is enabled and receives signal $S_3$. Similarly, a signal $S_{10}$ from port 10 (called) is transferred to Tx bus 110 during slot 21 and is delayed one half frame or 16 time slots before being transferred to the Rx bus 112 as time slot 5 of the next frame occurs when port 3 (calling) is again enabled to receive the signal $S_{10}$ from port 10 (called) via Rx bus 112 and to simultaneously transfer a new signal to the Tx bus 110.

Importantly since the frame is automatically cycled for each bus, the information between ports 3 and 10 is automatically bi-directional. For the example given above, information from port 10 is transferred to port 3. Thus full duplex communication is provided by the system of FIG. 3.

The delay circuit 120 is fairly simple to implement. It may comprise, for example an X/2 bit serial-to-serial shift register which merely shifts serials the data from bus 110 to bus 112.

Figure 5:
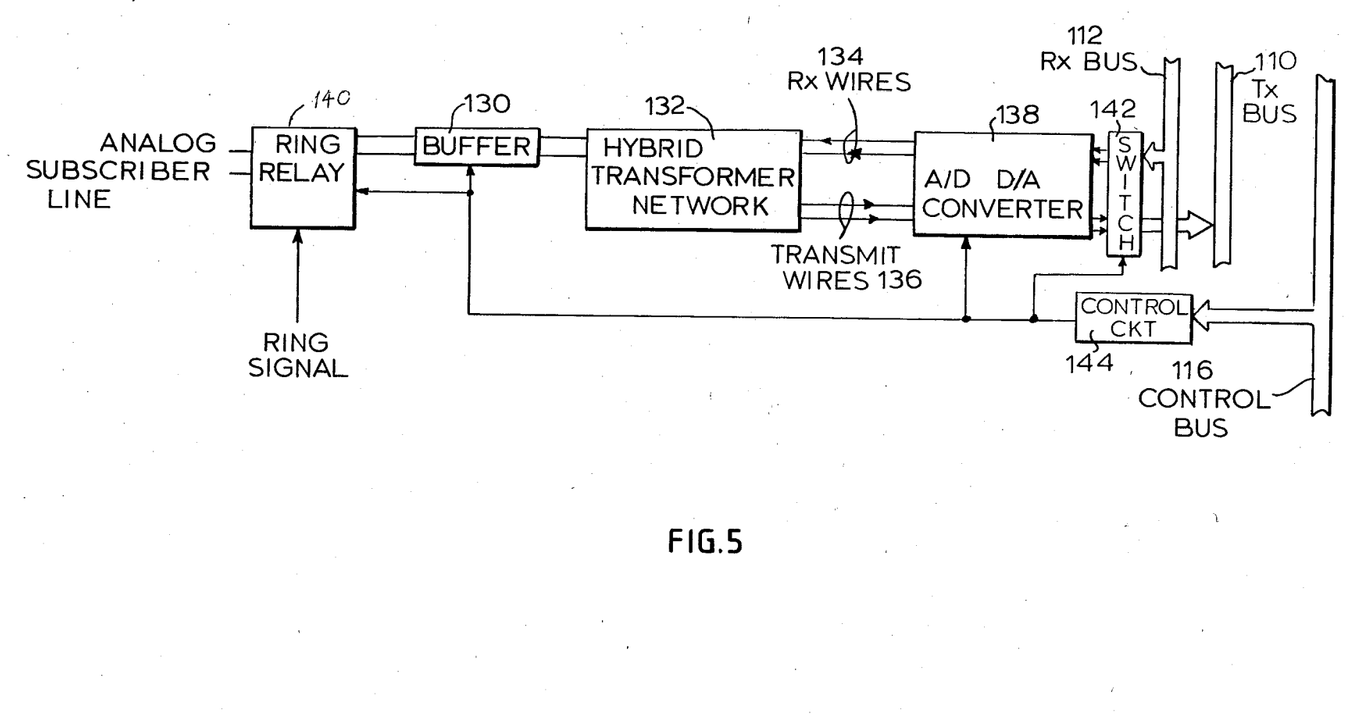
FIG. 5 shows details of an interface circuit for analog subscriber lines.

As previously mentioned the communication ports may be subscriber line interface circuits. Details of a typical line interface circuit are shown in FIG. 5. It comprises a buffer stage 130, and a hybrid transformer network 132 for a 2-to-4 wire conversion. A pair of Rx (Receive) wire 134 and a pair of Tx (Transmit) wires 136 are connected between hybrid network 132 and A/D, D/A converter 138 as shown. The converter converts the analog signals from line 1 on wires 136 into PCM-encoded digital signals which are then transferred to Tx bus 110 through a switch 142. Similarly the PCM digital signals from Rx bus 112 are received at switch 142 and are fed to the line circuits where they are converted into analog signals which are then sent on wires 134 to the analog subscriber line. Converters such as A/D, D/A converter 138 are well known in the art and are described in U.S. Pat. Nos. 4,161,633 and 4,270,027. The converter could also be used to convert the signals to PAM-encoded signals as opposed to PCM-encoded signals. The buffer 130, converter 138, ring relay 140 and switch 142 receive appropriate control signals from a control circuit 144 which receives control signals from control bus 116.

A ring signal is generated on the subscriber line by activating ring relay 140 by an appropriate signal from the control microprocessor.

Figure 6:
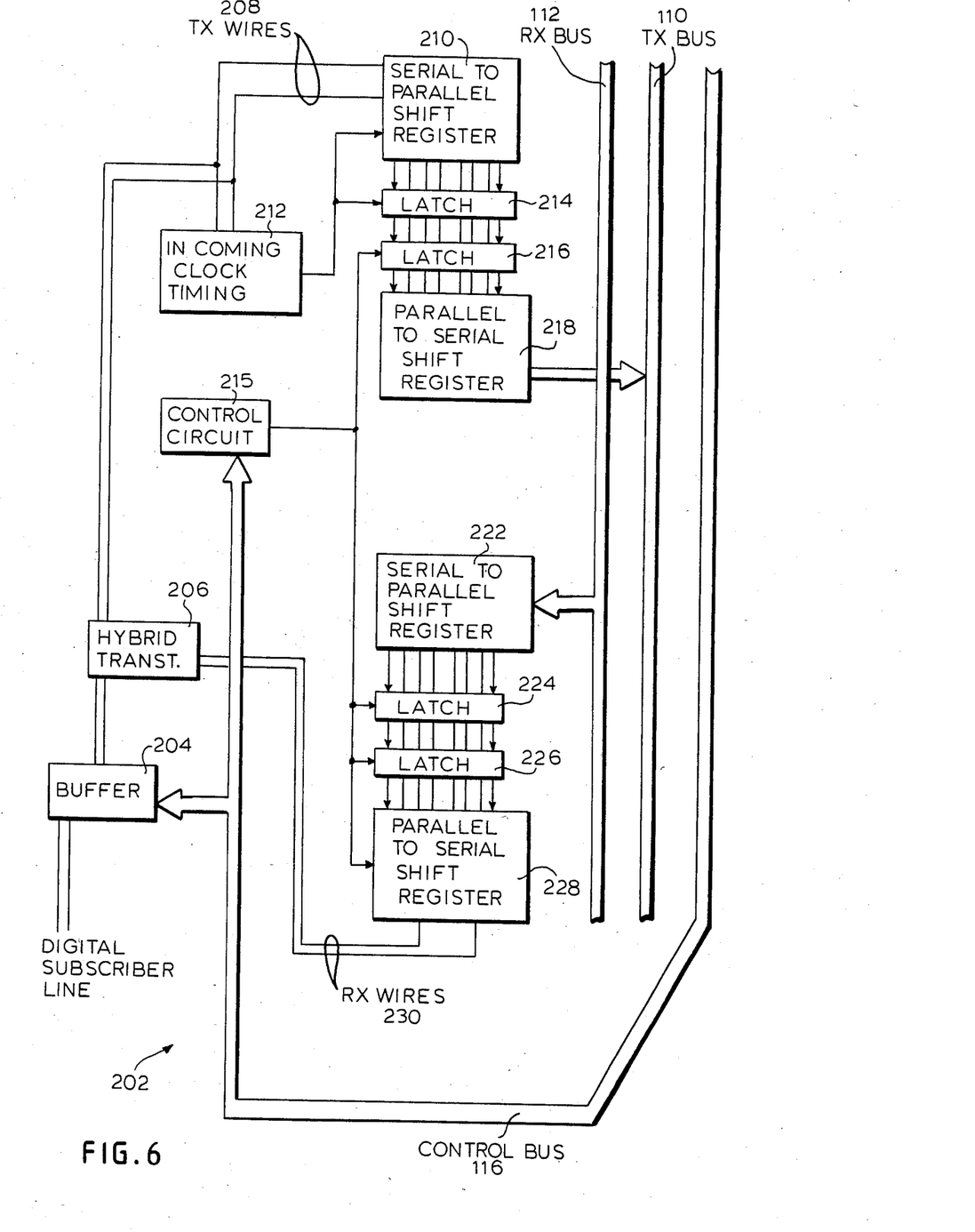
FIG. 6 shows details of an interface circuit for a digital subscriber lines.

In FIG. 6, a line interface circuit is shown for a digital subscriber line. The circuit 202 comprises a buffer 204 and a hybrid transformer network 206 for 2-to-4 wire conversion. A pair of Tx wires 208 are used to load the incoming signals from the subscriber line to a first serial-to-parallel register 210. Tx wires 208 are also connected to a circuit 212 provided to determine the clock timing of the incoming digital signals. The signals from register 210 are synchronously loaded into a first latch 214 using the recovered clock timing. A system control circuit 215 receives signals from the control microprocessor on control bus 116 which are used to transfer the data from latch 214 to a second latch 216. Thus latches 214 and 216 are used to compensate for the phase difference between the digital subscriber line and the switching network.

From latch 216 the data is fed to a parallel-to-serial shift register 218 which feeds the data to Tx bus 110.

Similarly, from Rx bus 112 the PCM signals are transferred into a serial-to-parallel shift register 222. From shift register 222 the data is transferred to a third latch 224 in accordance to system timing circuit 215. From latch 224 the data is transferred to fourth latch 226 and from latch 226 to another parallel to serial shift register 228 in accordance with control signals from control circuit 215. From register 228 the data outgoing signals are transferred by Rx wires 230 to hybrid transformer 206 and then back to the subscriber line. The switching or strobing function necessary to transfer signals to the Tx bus and receive signals from the Rx bus is accomplished by the control circuit 215 in conjunction with the latch which allows signals to shift out or in.

The switching system described herein is well suited for a relatively small digital system such as a PABX. Various circuits could be added to perform various auxiliary functions. For example a 400 Hz signal generator could be used as a signal source to feed to slot No. 0 of the Tx bus. This slot or channel may then be used to generate "call progress signalling" (dial tone, busy tone, ring back, etc.). For example a "call-in-progress" signal (busy tone) may be generated whenever one line attempts to access a second line and the second line is already engaged. In such a case the first line would be assigned to slot 16 of the Rx bus (in a 32-slot frame system) to receive said 400 Hz signal.

Cadencing the tone on the assigned time slot to generate the desired "Call Progress Signal" is done simply by periodically enabling and disabling the line interface 102, 104, 108 at a rate determined by the microprocessor 114.

Other circuits which could be added are ringing circuits, ring-back circuits, pulse and/or tone dialing signal detect circuits and so on. These circuits are well known in the art and need not be described in greater detail.

Furthermore one skilled in the art could make other modifications to the described invention without departing from its scope as defined in the appended claims.

What is claimed is:

1. A communication switching system for selectively inter-connecting a plurality of lines, comprising:
   a transmit bus for propagating a plurality of incoming signals in a repetitive sequence of time slots each sequence defining a frame;
   a receive bus for transmitting said plurality of signals in said repetitive sequence of time slots;
   a communication port for each of said lines for accessing simultaneously said transmit and receive bus during a selected slot;
   control means for assigning a selected slot to each of said communication ports, and for activating the respective communication ports during the selected slots, said control means assigning time slots that differ by one-half frame to said communication ports associated with two interconnected lines; and
   transfer means for delaying said incoming signals on said transmit bus by a half-frame period and for producing outgoing signals on said receive bus by transferring the delayed incoming signals from the transmit bus to the receive bus.

2. The system of claim 1, wherein incoming and outgoing signals are PCM signals.

3. The system of claim 1, wherein incoming and outgoing signals are PAM signals.

4. The system of claim 1 wherein said communication ports are adapted for analog signals on said subscriber lines.

5. The system of claim 1 wherein said communication ports are adapted for digital signals in said subscriber line.

6. The system of claim 1 wherein said transfer means comprises a serial-to-serial shift register.

7. In a communication switching system for interconnecting a plurality of lines by providing a transmit bus for propagating a plurality of incoming signals in time slots assigned to each incoming signal, said time slots comprising a frame, and a receive bus for propagating said plurality of signals in time slots, the improvement comprising: transfer means for delaying said incoming signals on said transmit bus by one half frame and for transferring the delayed signals from the transmit bus to the receive bus to form outgoing signals; and means for accessing said lines to said transmit and receive buses during time slots assigned to said lines such that the time slots for interconnected lines are spaced one half frame apart.

8. The improvement of claim 7 wherein said incoming and outgoing signals on said transmit and receive buses are PCM signals and said transfer means comprises a shift register with X/2 serial cells where X is the number of time slots per frame.

9. A method of switching signals between communication ports, lines comprising the steps of:
   assigning a first time slot to a first communication port and a second time slot to a second communication port that is to be in bi-directional communication with the first communication port, a plurality of said time slots defining a frame, said first and second time slots being spaced one half frame period apart;
   passing incoming signals from said communication ports, during the time slots assigned to said ports, to a transmit bus;
   delaying said incoming signals on said transmit bus by one-half frame period and transferring said delayed signals to a receive bus; and
   passing signals from said receive bus to said communications ports during the time slots assigned to said communication ports.

10. A method of switching signals between a plurality of communication ports, comprising the steps of:
   assigning pairs of first and second time slots to pairs of first and second communication ports that are to be in bidirectional communication with each other, a plurality of said time slots defining a frame, the first and second time slots of said pairs being spaced one half frame period apart;
   passing incoming signals from said communication ports, during the time slots assigned to said ports, to a transmit bus;

delaying said incoming signals on said transmit bus by one half frame period and transferring said delayed signals to a receive bus; and passing signals from said receive bus to said communication ports during the time slots assigned to said communication ports.

11. A communication switching system comprising:

a plurality of communication ports for processing incoming and outgoing signals, each communication port having an input port and an output port;

a transmit bus associated with each output port for propagating incoming signals from said output ports;

a receive bus associated with each input port for propagating outgoing signals to said input ports;

transfer means for transferring said incoming signals on the transmit bus to the receive bus to form said outgoing signals and for delaying said incoming signals a predetermined time period; and control means connected to each communication port for providing control signals thereto, said communications ports being responsive to the control signals to access the transmit and receive buses through their output and input ports, said control signals being selectively provided to communication ports that are to communicate with each other during time slots spaced in time by the predetermined time period whereby an incoming signal from a first communication port that is to communicate with a second communication port is passed to the transmit bus during a first time slot, said incoming signal is delayed the predetermined time period and is transferred to the receive bus as an outgoing signal, said second communication port accesses the receive bus during a second time slot one predetermined time period after the first time slot to receive the outgoing signal, the control means providing a repetitive sequence of control signals to the communication ports, the duration of said sequence defining a frame time and said predetermined time period being equal to one-half the frame time.

12. The system of claim 11, wherein the input and output ports of a communication port simultaneously access said receive and transmit buses.

13. A communication switching system, comprising:

a plurality of communication ports for processing incoming and outgoing signals, each communication port having an input port and an output port;

a transmit bus associated with each output port for propagating incoming signals from said output ports;

a receive bus associated with each input port for propagating outgoing signals to said input ports;

transfer means for transferring said incoming signals on the transmit bus to the receive bus to form said outgoing signals and for delaying said incoming signals a predetermined time period; and control means for providing pairs of control signals to pairs of communication ports that are to communicate with each other, the c predetermined time period, said communication ports being responsive to the control signals to simultaneously access the transmit and receive buses to pass and receive the incoming and outgoing signals.

14. In a communication switching system for interconnecting a plurality of lines by providing a transmit bus for propagating a plurality of incoming signals from signal originating lines, and a receive bus for propagating a plurality of outgoing signals to signal destination lines wherein each calling line is assigned a distinct time slot and each called line is assigned a distinct time slot during which the calling and called lines may send and receive incoming and outgoing signals from said transmit and receive buses, incoming signals on the transmit bus in the time slots of the signal originating lines are transferred to the receive bus and into the time slots of the signal destination lines the total of said time slots defining a frame, wherein the improvement comprises:

means for spacing the time slots of the calling and called lines one-half frame apart; and means for delaying incoming signals on said transmit bus by a one-half frame period and thereafter transferring said incoming signals to the receive bus where they become outgoing signals.

* * * * *

UNITED STATES PATENT AND TRADEMARK OFFICE
CERTIFICATE OF CORRECTION

PATENT NO. : 4,601,029
DATED : Jul. 15, 1986
INVENTOR(S) : Franklin Hargrave;Francisco A. Middleton It is certified that error appears in the above-identified patent and that said Letters Patent is hereby corrected as shown below:

Claim 13, line 18, after the "c" insert --ontrol signals of each pair being spaced in time by the--.

Signed and Sealed this

Seventh Day of April, 1987

Attest:

DONALD J. QUIGG

Attesting Officer

Commissioner of Patents and Trademarks